Figure 14:
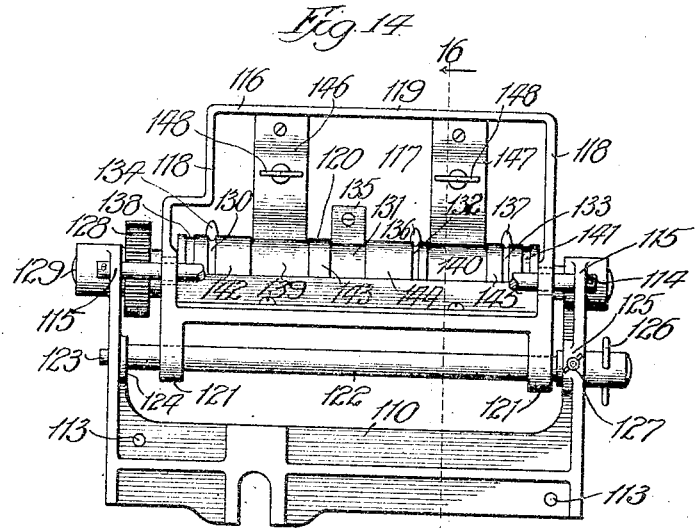

M. J. MILMOE.
LABELING MACHINE.
APPLICATION FILED NOV. 5, 1910.
1,126,822.
Patented Feb. 2, 1915.
11 SHEETS—SHEET 1.
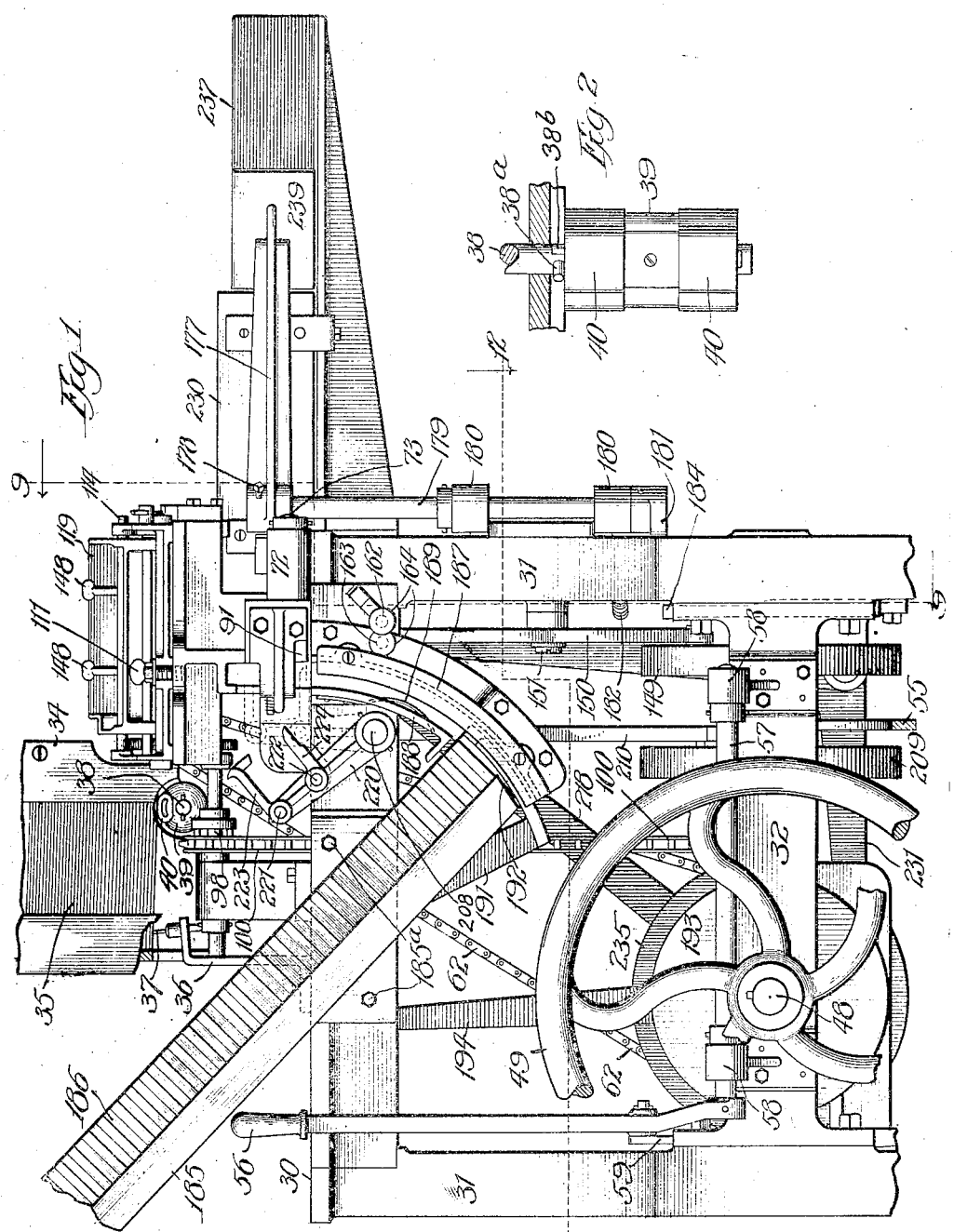

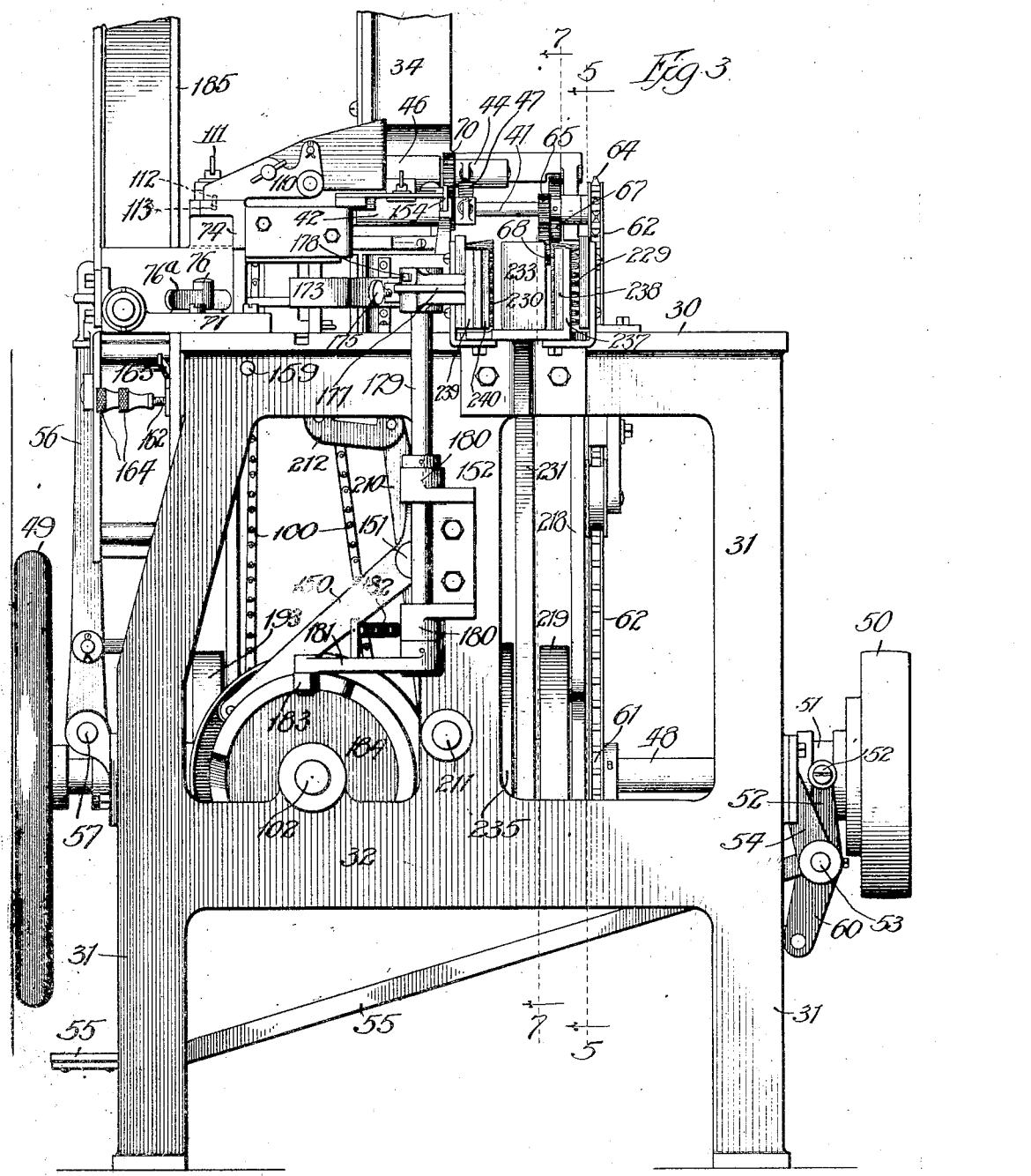

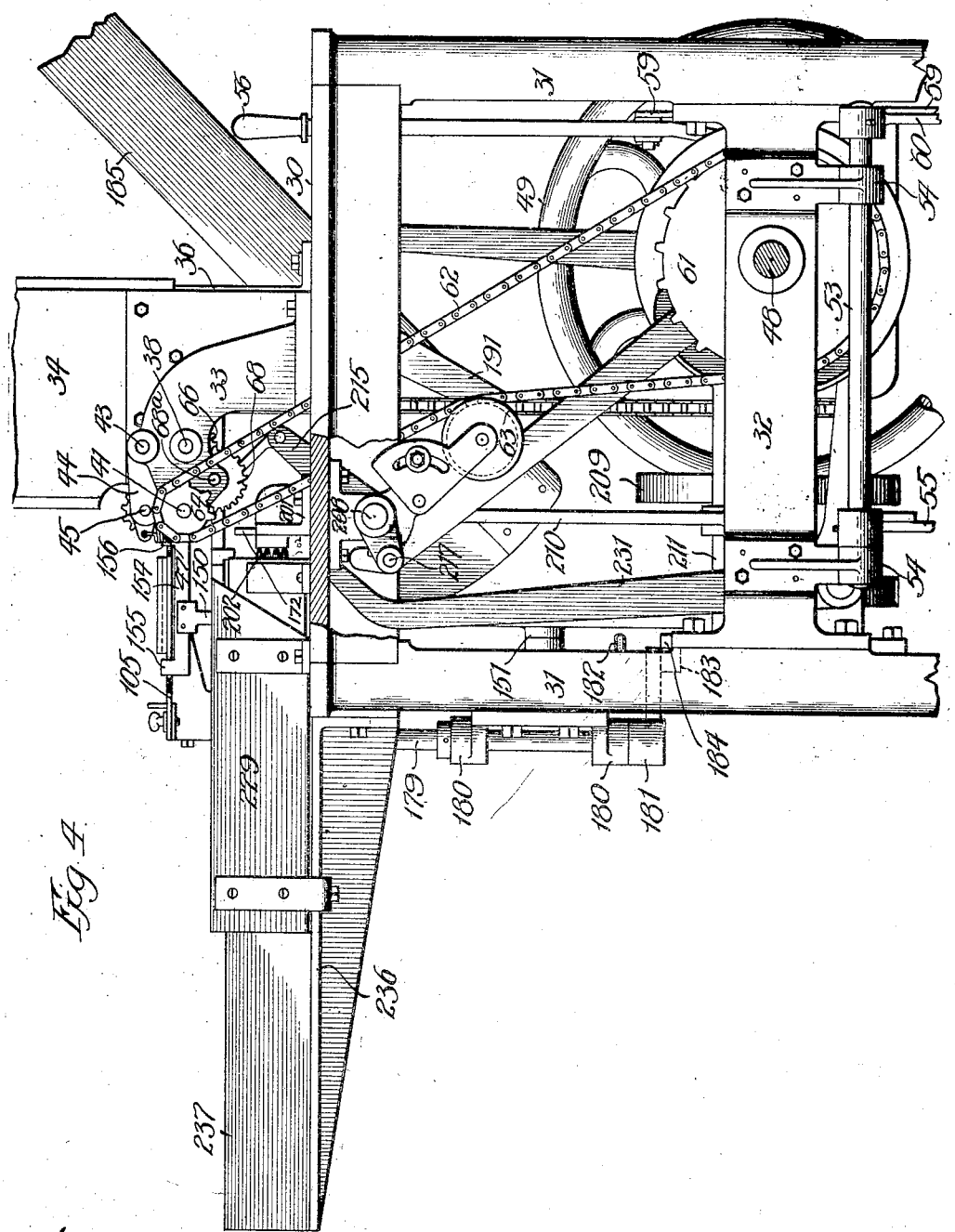

M. J. MILMOE.
LABELING MACHINE.
APPLICATION FILED NOV. 5, 1910.
1,126,822.
Patented Feb. 2, 1915.
11 SHEETS—SHEET 4.
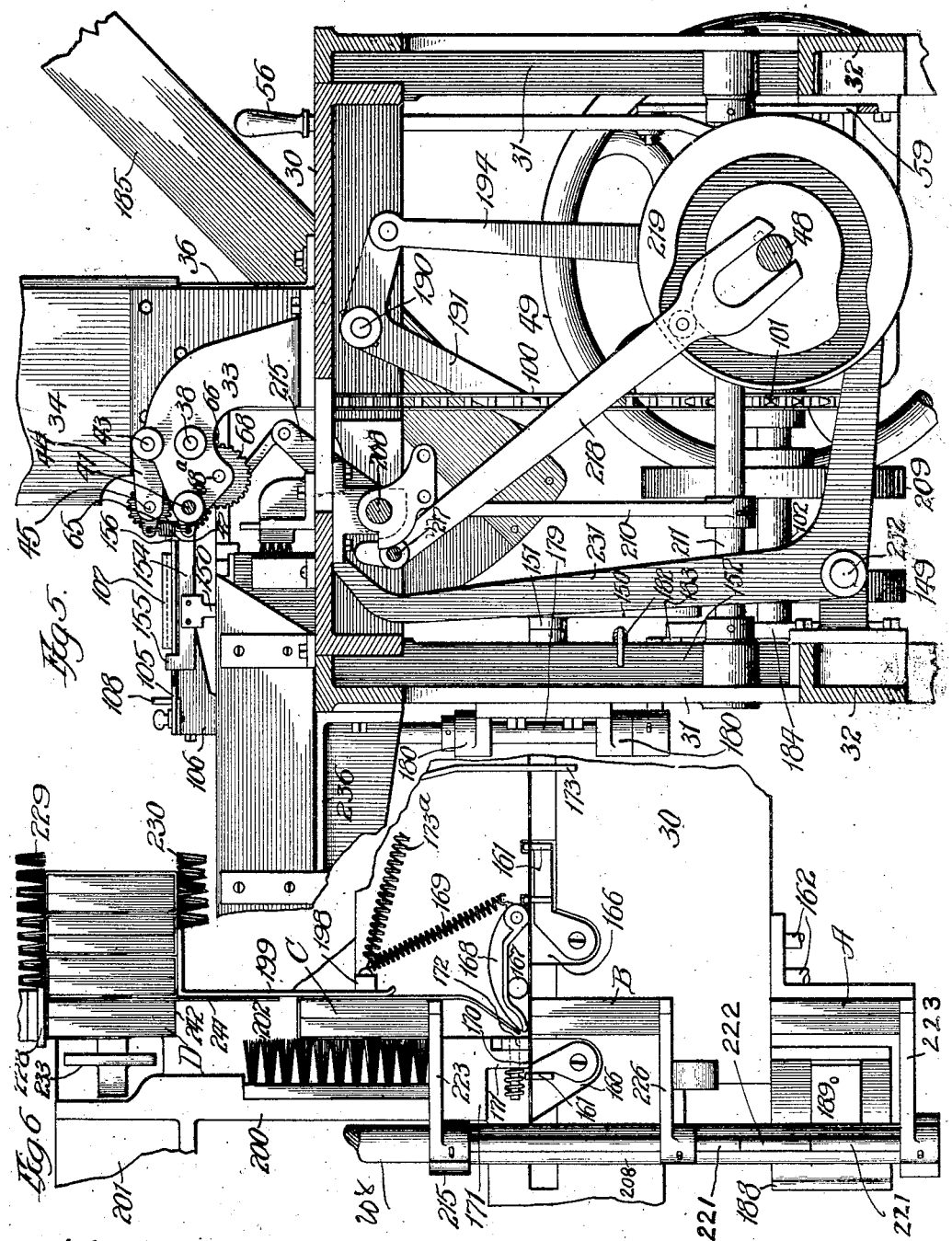
Witnesses
Geo. C. Davison
D. M. Ford
Inventor:
Michael J. Milmoe
By Luthicum Behr & Fuller
Attys

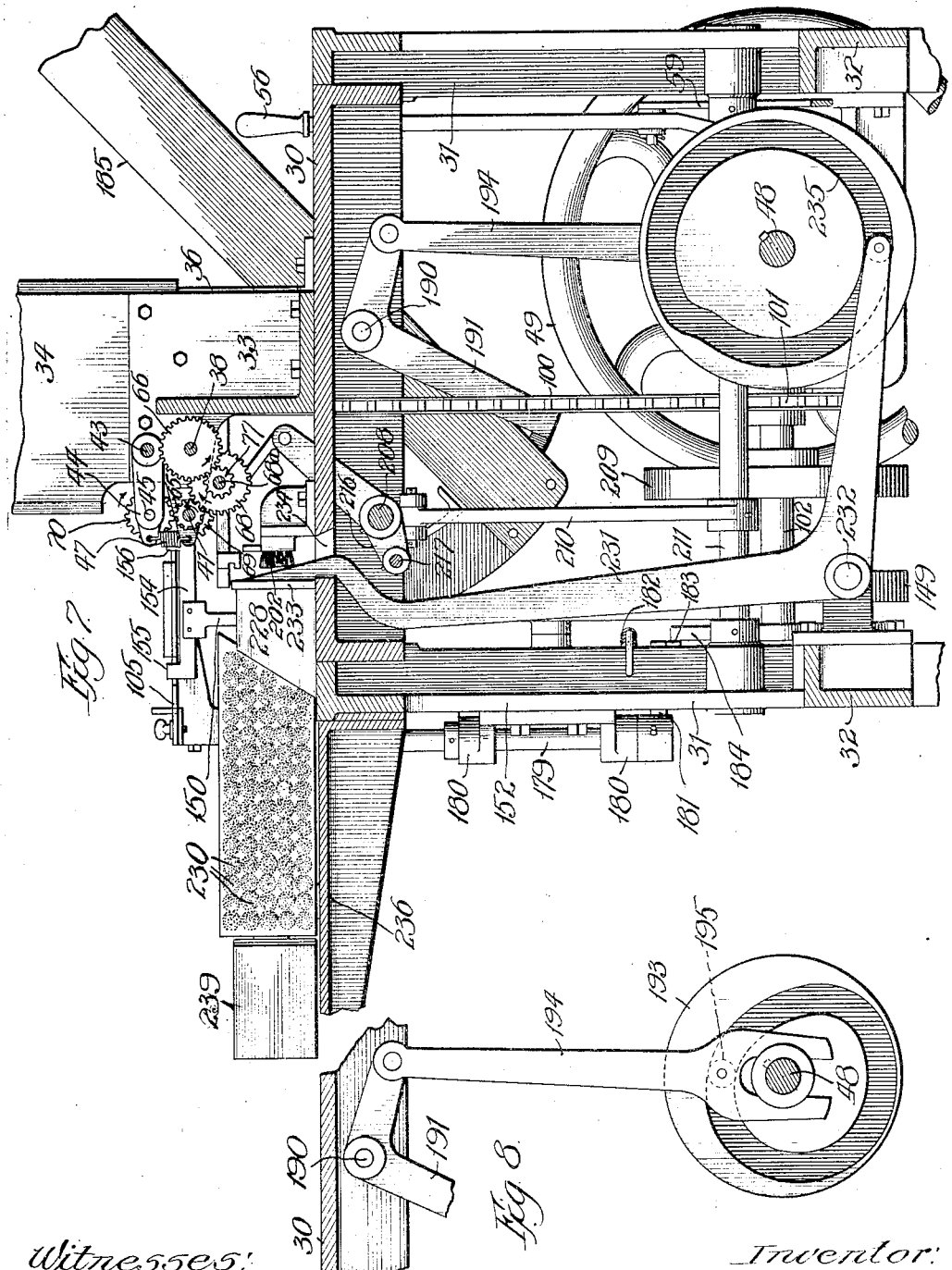

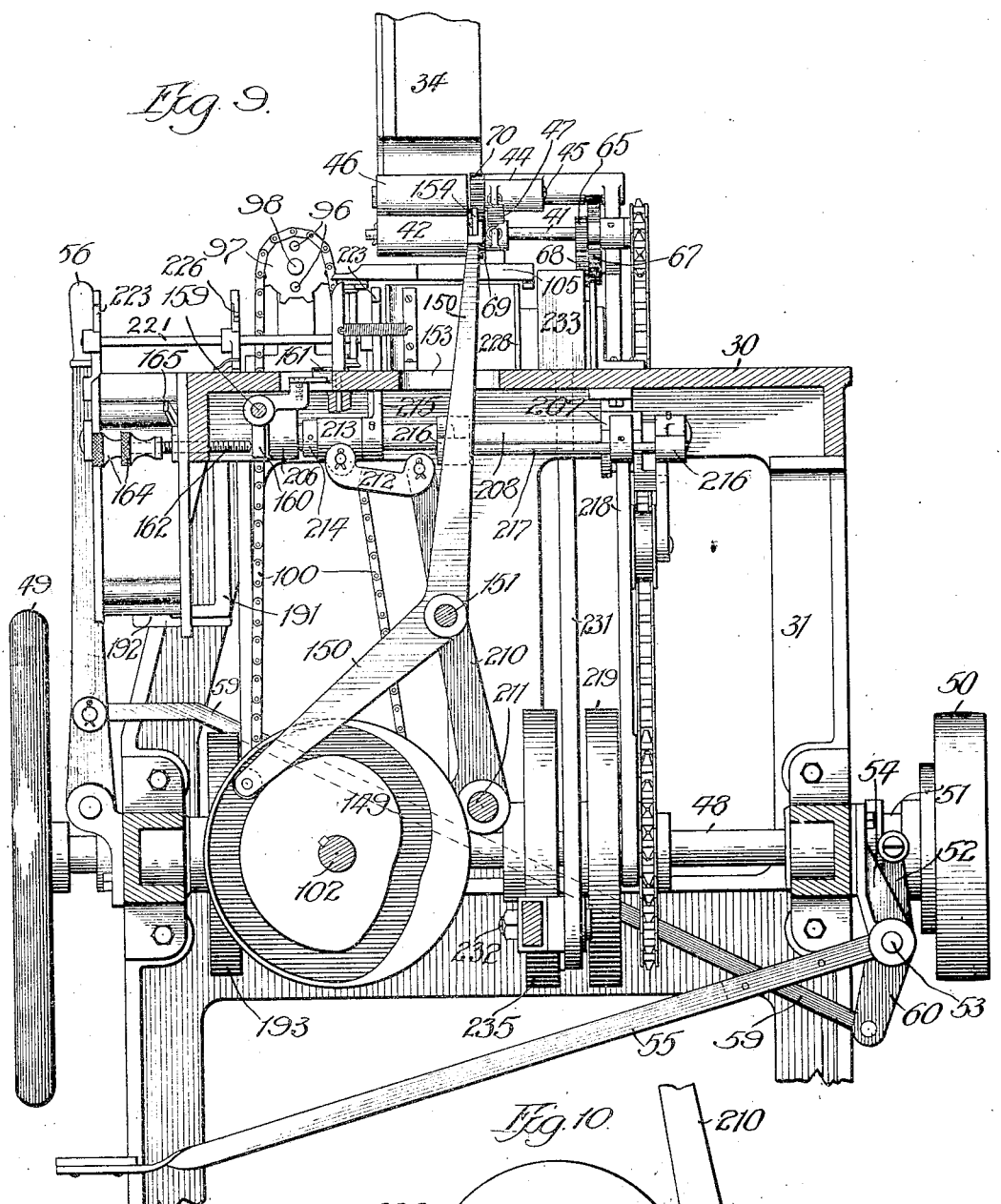

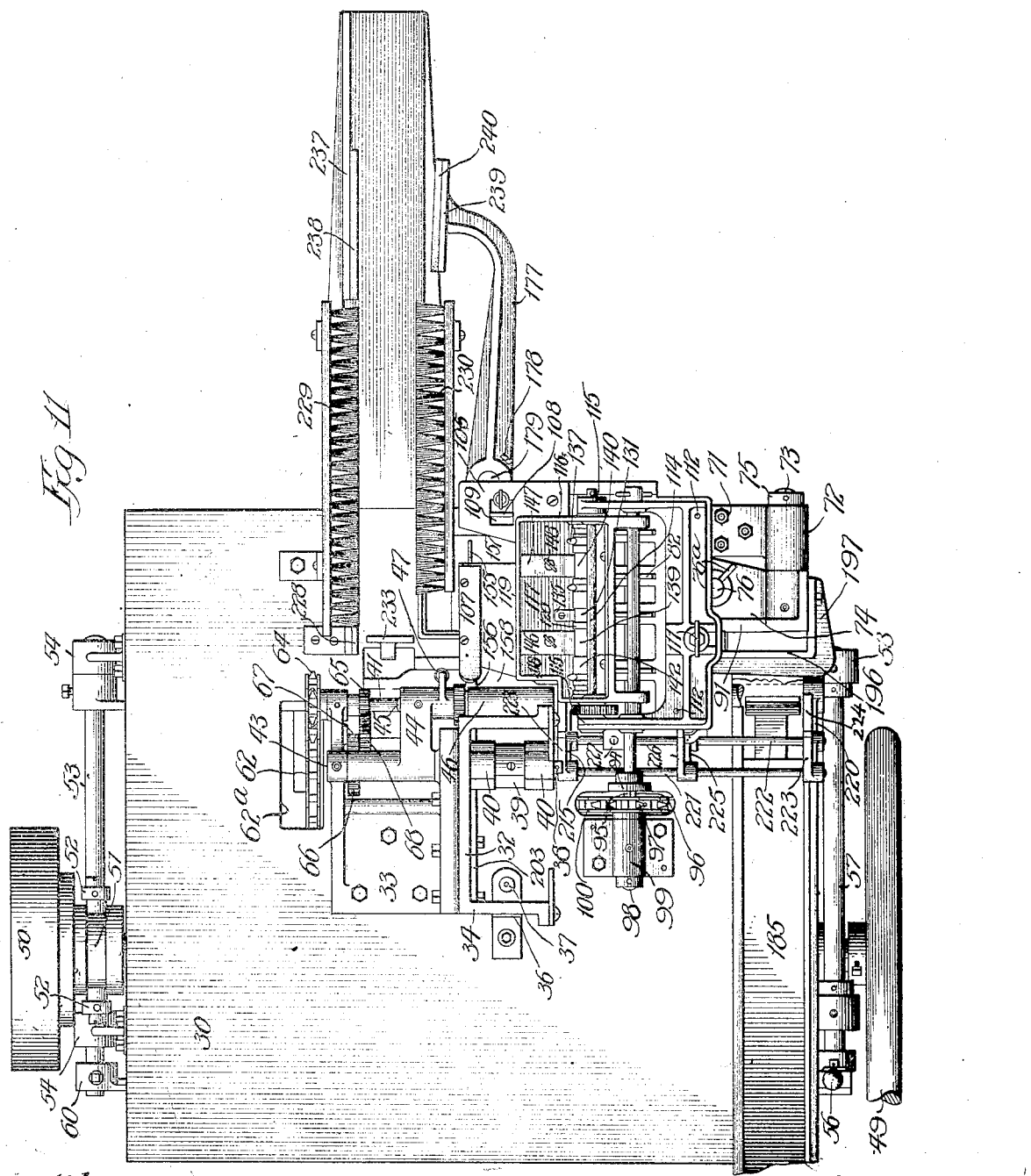

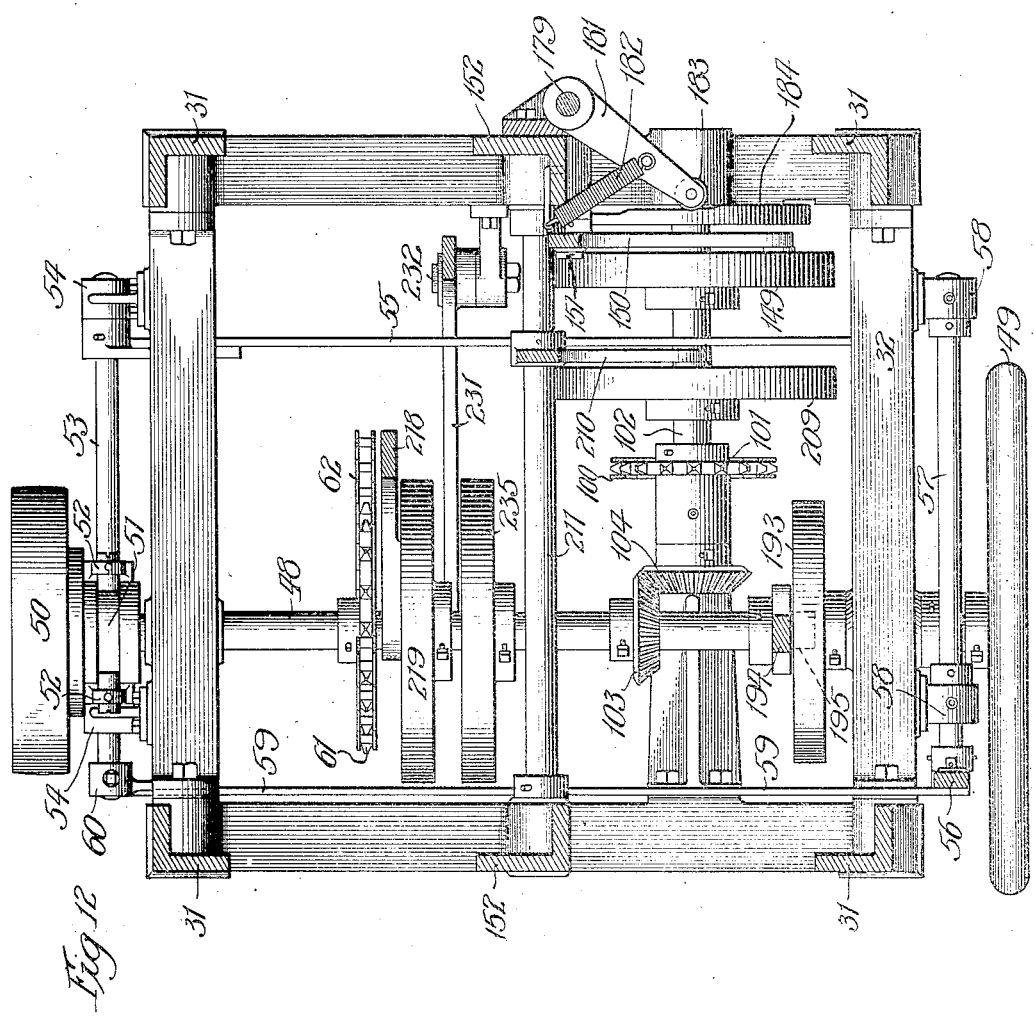

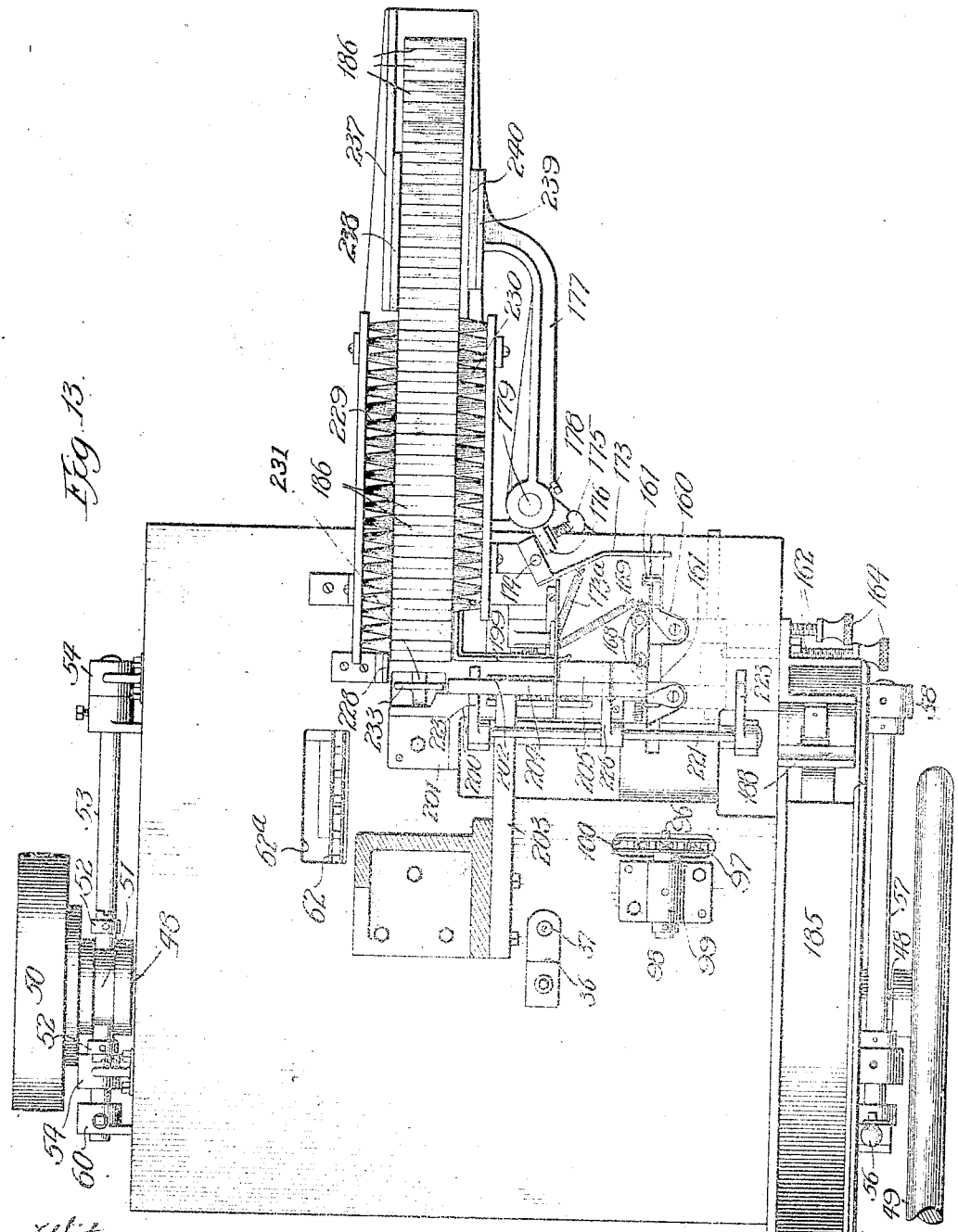

M. J. MILMOE.
LABELING MACHINE.
APPLICATION FILED NOV. 5, 1910.

1,126,822.

Patented Feb. 2, 1915.
11 SHEETS—SHEET 10.

Witnesses:
Geo. C. Davis
D. M. Ford

Inventor:
Michael J. Milmoe,
By Luthwein Behr &
Fuller Attys.

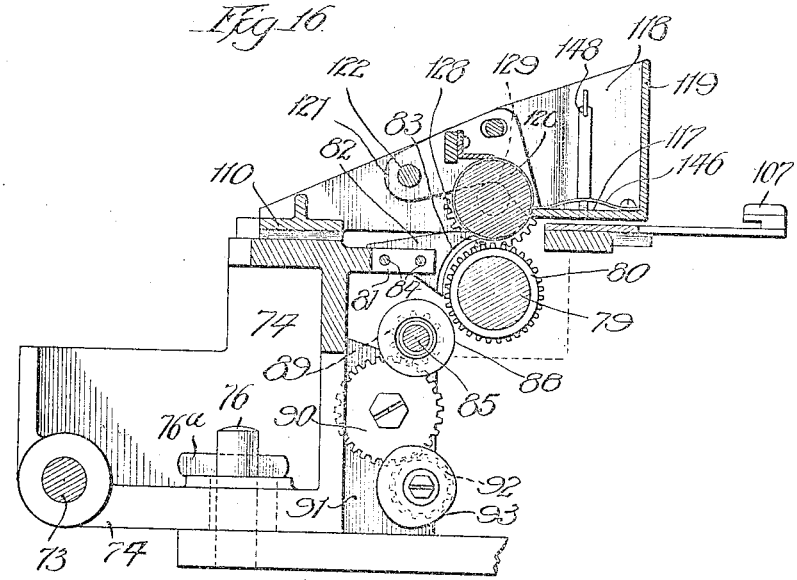
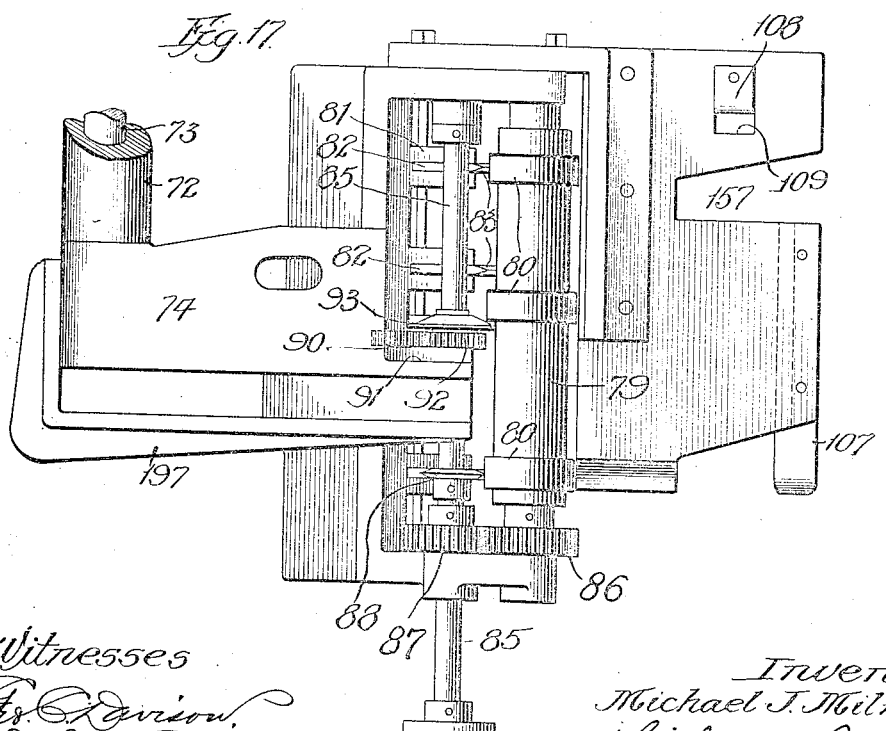

UNITED STATES PATENT OFFICE.

MICHAEL J. MILMOE, OF CHICAGO, ILLINOIS, ASSIGNOR TO W. C. RITCHIE & COMPANY, OF CHICAGO, ILLINOIS, A CORPORATION OF ILLINOIS.

LABELING-MACHINE.

1,126,822. Specification of Letters Patent. Patented Feb. 2, 1915.

Application filed November 5, 1910. Serial No. 590,949.

*To all whom it may concern:*

Be it known that I, MICHAEL J. MILMOE, a citizen of the United States, residing at Chicago, in the county of Cook and State of Illinois, have invented certain new and useful Improvements in Labeling-Machines, of which the following is a specification.

My invention pertains to the art of covering pasteboard boxes or the like with labels or covering papers or fabrics.

More particularly, but not exclusively, the invention relates to the application of adhesive paper labels to cigarette boxes wherein the labels completely surround the boxes and form the hinges between the body portions and the covers of the same. Ordinarily such labels are applied to the assembled box and cover, being subsequently slit along one edge between the two parts to permit the box to be opened, such slit being afterward sealed with the Government revenue stamp.

Among the leading aims and purposes of the invention I may mention, first, to rapidly, mechanically, and automatically apply the labels to the boxes; second, to supply a sufficient and satisfactory means for individually feeding and pasting the labels, and in proper timed relation feeding the boxes and applying the labels thereto; third, to employ an apparatus in which the paste is purposely unevenly distributed on the label; fourth, to use various means for exerting pressure on the label to obtain an efficient adhesion between the same and the box; fifth, to provide a mechanism of this character which will be relatively simple in construction, satisfactory in use, and comparatively economical to manufacture.

In order that a full and complete understanding of this invention may be had, I have illustrated a preferred and desirable embodiment of the same in the accompanying drawings, throughout the various views of which like reference characters refer to the same parts.

Figure 15:
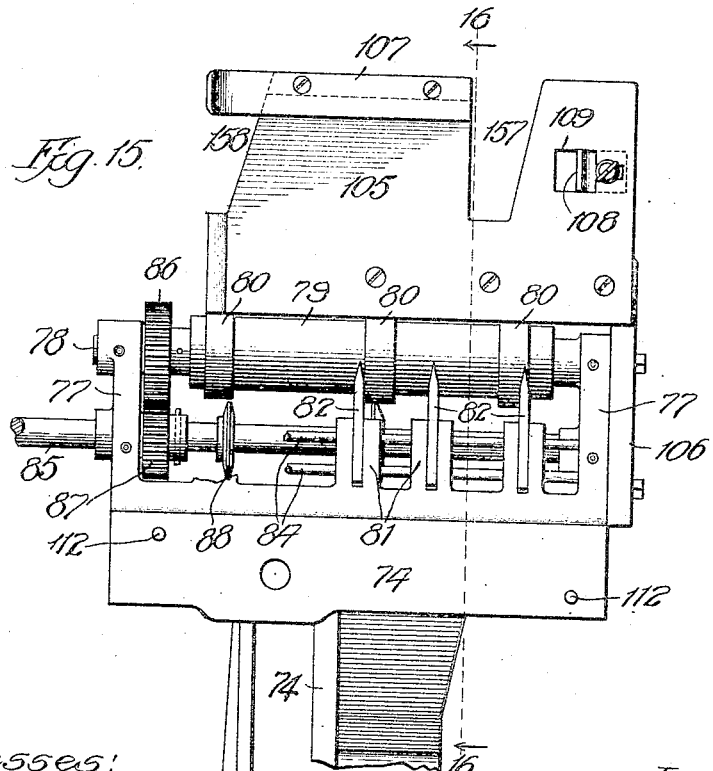

In these drawings—Figure 1 is a fragmentary front or face elevation of the machine; Fig. 2 is a fragmentary section showing the loose connection between one of the label-feeding rollers and its actuating shaft; Fig. 3 is an elevation of the right-hand end of the machine as viewed in Fig. 1; Fig. 4 is a fragmentary rear elevation of the machine with parts omitted and other parts cut away; Fig. 5 is a fragmentary vertical section on line 5—5 of Fig. 3, the parts being viewed in the direction indicated by the arrows; Fig. 6 is a fragmentary plan of a portion of the mechanism on the table top, with parts omitted for the sake of clearness, and indicating the various positions occupied by the boxes in their traverse across the table top; Fig. 7 is a vertical section on line 7—7 of Fig. 3, the parts being viewed in the direction indicated by the arrows; Fig. 8 is a sectional detail showing the cam for moving the boxes in the box-chute; Fig. 9 is a vertical section on line 9—9 of Fig. 1; Fig. 10 is a fragmentary section showing the cam for sliding the reciprocatory shaft; Fig. 11 is a fragmentary plan view of the machine; Fig. 12 is a horizontal section on line 12—12 of Fig. 1; Fig. 13 is a plan view of the machine with several parts omitted and with the label-chute cut away; Fig. 14 is a plan view of the detachable paste-applying mechanism; Fig. 15 is a plan view of the removable label shelf and guides and rollers for shifting the label into vertical position; Fig. 16 is a vertical section on the two lines 16, 16 of Figs. 14 and 15 when the appliances in such figures are assembled one on top of the other; and Fig. 17 is a bottom plan view of the part of the mechanism shown in Fig. 15.

The particular embodiment of this invention shown in these drawings comprises a flat, apertured table 30 supported on suitable legs 31 connected together by horizontal members 32. Substantially centrally on top of the table I bolt a bracket member 33, to the front side of a vertical portion of which I bolt or otherwise secure an upright chute 34 open on the front side as is clearly indicated, and adapted and intended to accommodate a stack or series of paper or other labels 35, such labels being placed in the chute face downward. Also on this table 30 beneath the chute I bolt another small needle-bracket 36 carrying at its upper end an upstanding supporting needle 37 on which a stack of labels rests, the needle being sufficiently sharp to penetrate four or five of the labels, which are ordinarily made of paper. A horizontal roller shaft 38 is rotatably mounted in suitable bearings in the bracket member 33, the shaft projecting forwardly beneath the chute and at such point having mounted thereon a roller 39 recessed on its periphery to accommodate a pair of rubber sectors 40, adapted when they engage the lowermost label to feed the same to the right as the machine is viewed from the front, as illustrated in Fig. 1, the friction between such rubber sectors and the bottom label being sufficient to draw such label away from the needle point 37, the latter acting to retain the labels next immediately above in unmoved position. This roller 39 has a pin 38$^b$, Fig. 2, whereby the roller is rotated by the engagement of said pin with the pin 38$^a$ on the shaft 38, thus permitting the roller to turn a given amount freely on such shaft, until the pin 38$^b$ engages the opposite side of pin 38$^a$. Inasmuch as this method of feeding the ungummed labels individually from the stack or pile forms no part of the present invention, further description of the construction of the same is deemed unnecessary. Also rotatably mounted in the supporting bracket 33 is another roller shaft 41 having fixed thereto a metallic roller 42 adjacent to the bottom of the label chute. In addition, and rockingly mounted in the bracket 33, and capable of oscillation about the axis 43 (Figs. 4 and 11), I employ an arm 44 supplied with a bearing for another shorter or upper roller shaft 45 having fixed thereto another roller 46 acting as a companion for roller 42. The arm 44 and the roller which it carries are pulled downwardly by a short coil contractile spring 47 engaging apertured lugs on the arm and on the bracket. In this way the two rollers 42 and 46 are yieldingly pressed toward one another and are provided for the purpose of engaging the labels individually as they are fed from the chute by the roller 39 and its rubber sectors 40. The driving mechanism for these various shafts and the three coöperating label-feeding rollers comprises the following parts: Extending from the front to the rear of the machine in the lower portion of the latter, is a main drive-shaft 48 (Figs. 4 and 12) rotatable in suitable bearings in the machine frame and equipped at its forward end with a hand-wheel 49, and at its rear end with a driving pulley 50 adapted to be rotated by a belt from any suitable source of power, and adapted also to be clutched and unclutched from the drive-shaft 48 by any suitable or desirable form or style of clutch mechanism 51 capable of actuation into operative or inoperative position by a pair of arms 52 mounted on a rock-shaft 53 supported in bearings 54 at the rear of the machine. This shaft 53 may be rocked or oscillated to control the clutch either by a treadle 55 fixedly connected to the shaft, or by means of a handle 56 at the front of the machine secured to a front rock-shaft 57 oscillatory in suitable bearings 58 on the front horizontal member 32, such handle being connected by a comparatively long link 59 to an arm 60 fixed on the end of rock-shaft 53. Passing around a relatively-large sprocket wheel 61 on the main drive shaft, I employ a sprocket chain 62 which passes over an adjustable idler 63 and takes around a small sprocket wheel 64 on shaft 41 passing through an aperture 62$^a$ (Fig. 11) in the table top. The rubber roller shaft 38 is driven from shaft 41 by means of the intermeshing gears 65 on shaft 41, 66 on shaft 38, and the two intermediate gears 67 and 68 fixedly connected together and rotatable on the stationary stud 68$^a$ on bracket 33. The two shafts 41 and 45 are also connected together by the intermeshing gears 69 and 70 mounted on such shafts at the rear ends of their coöperating rollers.

From the above description it will be apparent that the drive shaft, by means of the sprockets wheels, sprocket chains, and gears referred to, rotates the label-feeding rollers 39, 42, and 46 in the directions indcated by the arrows, and that the pair of rollers 42 and 46 revolve more rapidly than does the first roller 39, so that this roller, which is equipped with the rubber sections, merely starts the lowermost label, and the more rapidly revolving pair of rollers quickly withdraws it from the pile or stack of labels. During this rapid travel of the label the roller 39 is revolving freely on its shaft 38, but at the proper time, owing to the loose connection 38$^a$ between such roller and shaft, the latter again causes the slow rotation of the roller and the feeding of the next label.

On top of table 30 I detachably mount a bearing member 71 having a bearing 72 to accommodate the laterally-extended trunnions 73 of a bracket 74, such trunnion being supplied with a collar 75 at its end to prevent displacement of the bracket. Owing to this mounting of the bracket on the table, the former may be swung forwardly out of the way when necessary to inspect or adjust any of the other adjacent parts of the machine, and in order that such swinging bracket may be held fixedly in operative position, I provide the appliance with a screw-threaded stud 76 taking into a threaded hole in the table and equipped with a wedge-key 76$^a$ adapted to extend through a slot in the stud above the bracket. By means of this key the stud may be turned so that the key or bar securely holds the bracket down in position. This bracket member 71 has two rearwardly-extended arms 77 equipped with bearings for a feed-roller shaft 78 having mounted thereon a feed-roller 79 supplied with a plurality of spaced rubber rings 80. Between the end arms 77, bracket 74 is equipped with a plurality of smaller rearwardly-extended arms 81, each of which is slotted for the accommodation of a label guide 82 having a concave edge 83 substantially concentric with the axis of shaft 78, these various guides being held in their slotted arms 81 by a pair of holding rods 84 extended through apertures in all the parts. The two arms 77 of the bracket 74 also have bearings for another label-feeding shaft 85, the two shafts 78 and 85 being connected together by the intermeshing gears 86 and 87. Shaft 85 has fixed thereto a plurality of narrow-edged rollers 88 which are adapted to contact with the adhesive face of the label, as explained hereinafter. It should be noticed also that shaft 85 near its central portion is equipped with a small gear 89 meshing with the teeth of a larger intermediate one 90 revolvingly mounted at one side of the vertical plate portion or guide 91 of bracket 74, such intermediate gear in turn meshing with a smaller gear 92 below it rotatably mounted on the part 91 and fixed to a mutilated narrow-edged feed-roller 93, Fig. 16.

It will be noticed that shaft 85 is somewhat longer than the bracket and that its protruding end has pinned thereto a disk 94 equipped with a pair of outstanding pins 95 which are adapted to coöperate with a similar pair of pins 96 extended laterally from the face of a sprocket wheel 97 on a short shaft 98, rotatable in a bearing member 99 bolted on top of the forward portion of table 30. This pin sprocket-wheel is rotated by means of a sprocket chain 100 passing therearound, and also coöperating with a larger sprocket-wheel 101 (Fig. 12) on the longitudinally-disposed lower shaft 102 revoluble in bearings on the frame of the machine, this longitudinal shaft 102 being driven from the main drive shaft 48 by the intermeshing bevel-gears 103 and 104. It should, therefore, be obvious that the rotation of the main shaft is transmitted to the longitudinal shaft through the bevel-gears, and that the rotation of the latter shaft is in turn transmitted to the sprocket-wheel and disk and coöperating pins and to the label-feeding rollers 79, 88, and 93. The labels as they leave the pair of rollers 42 and 46 are delivered face downward on a recessed label-shelf 105 supported on the bracket 74 by means of an angle bar 106. Extended longitudinally along the rear edge of this shelf I employ an undercut label-guide 107, and near one edge of the shelf I use an adjustable stop 108 adapted to limit the endwise travel of the label on the shelf, such stop having an upturned end extending above the shelf through an aperture 109.

Removably mounted on the top of the bracket 74 is a bifurcated paste-receptacle supporting-member 110 clamped in place by a thumb-screw 111 (Fig. 11), the proper position of such supporting member on the bracket being readily obtained by a pair of upstanding pins 112 on the bracket entering holes 113 in the supporting member. A rod 114 is supported in a pair of upstanding ears 115 on the arms or legs of the bifurcated supporting-member 110, and on such rod the paste-receptacle 116 is rockingly mounted, such receptacle or compartment having a bottom wall 117, two upstanding end walls 118, and a side wall 119, the other side of the receptacle being supplied with a paste-feeding roller 120. In order to adjust the position of this paste compartment toward and from the paste roller, I equip the former with a pair of forwardly-extended arms 121 Fig. 14 apertured in alinement so as to accommodate the eccentric portion 122 of an adjusting shaft 123 having bearings 124 and 125 in the supporting member 110, such shaft at one end having a handle 126 by which it may be adjusted, while one of the bearings is equipped with a thumb set-screw 127 adapted to hold the eccentric shaft in adjusted position.

As will be clear from an inspection of the drawings, the paste feed-roller 120 and the gear 128 fixed to one end thereof are revolubly mounted on the stationary shaft 129 supported by the arms of supporting member 110. When the paste receptacle and appurtenant parts are in proper position on the machine with the receptacle on the bracket 47 the gear 128 meshes with the gear 86, and by means of these parts the desired and proper rotation of the paste roller is obtained. Preliminary to describing the exact construction of this paste roller and coöperating elements, it is desirable to state that for several reasons it is advisable not to apply the paste, glue, or other adhesive, to the label evenly. It might be remarked that the manipulation and application of damp adhesive-coated labels present several difficulties, and, consequently, as little adhesive or paste should be applied to the label as is consistent with the proper application and adhesion of the label to the pasteboard box. In cigarette boxes the label ordinarily constitutes the hinge connecting the cover to the box-body proper, and it will be apparent, therefore, that that portion of the label should be supplied with a liberal quantity of the paste or other adhesive, whereas other portions of the label may advantageously be supplied with a less quantity; in fact, some parts of the label need have no adhesive applied at all. In order, therefore, to effect and bring about this uneven application of the paste, the feed-roller 120 is not made of a uniform diameter throughout its length, but is grooved at different points to permit the passage between the rollers and the bottom wall of the paste compartment of different quantities of the adhesive. It is desirable that those portions of the pasted side of the label which are to engage the various guides and rollers shall not have any adhesive applied thereto, and, consequently, the paste roller is grooved at 130, 131, 132 and 133 in alinement or register with the curved label-guides 82 and various label-feeding rollers 88 and 93. To prevent these grooves, however, from permitting the passage of the paste between the roller and the bottom of the paste compartment, the latter is supplied with suitable projections 134, 135, 136, and 137 extending into the grooves and reaching to the bottoms thereof. By this means four transverse portions of the label are prevented from having paste applied thereto. This paste-feed roller also has four shallow grooves 138, 139, 140, and 141, of which the grooves 139 and 140 feed the paste to those portions of the label adapted to form a hinge of the box and cover the front edge of the box. These parts receive the greatest amount of adhesive. The other grooves 138 and 141 permit the application of the adhesive to the end sections of the label, which obviously require a more liberal application of the adhesive than the remaining portions to which the glue is applied less liberally by the intermediate sections 142, 143, 144, and 145. In order that the relation of the amount of adhesive fed by the grooved parts 139 and 140 to that fed by the other parts of the roller may be varied, I supply the adhesive receptacle with a pair of bow-springs 146 and 147 in register with the grooves 139 and 140 of the roller and adjustable toward and from the same by the thumb-screws 148. By turning these screws down the ends of the springs may be caused to move toward the roller, and by turning the screws in the opposite direction such ends may be caused to recede from the roller, thereby governing the amount of adhesive applied.

In order to deliver the labels one by one from the shelf 105 to the label feed rollers and guide referred to above, which change the position of the label from horizontal to vertical, I equip the machine with the following coöperating parts: A cam 149 (Figs. 9 and 12) on the lower longitudinal shaft 102 rocks a bell-crank lever 150 fulcrumed at 151 on an upright member 152 of the machine frame, in proper timed relation to the movements of the other parts of the mechanism. As is indicated in the drawings, the upper end of such lever 150 projects above the table top through an aperture 153 and carries at such upper end a transverse pusher or feed bar 154 (Fig. 4) adapted to travel forwardly and rearwardly below the label shelf 105, such pusher having a pair of upstanding end fingers 155 and 156, both projecting upwardly above the top of the table shelf and traveling, respectively, in the recesses 157 and 158 (Figs. 11 and 15) of such shelf. As the labels individually engage the stop 108 they are pushed forwardly by the fingers 155 and 156, strike the curved edges 83 of the guides 82, and are fed down into vertical position by the rotation of the feed rollers 79 and disks 88 and 93.

Beneath the table top 30 I fulcrum at 159 (Fig. 9) a pair of substantially-right-angle label-supports 160, the top ends of which have ridges 161 (Figs. 6 and 13) adapted to support the labels vertically on edge. The height of these ridges, which extend slightly above the top surface of the table as shown in Fig. 9, is adjustable and controllable by a pair of screws 162 and 163 bearing against the depending ends of the members 160, passing through threaded holes in the frame of the machine, and equipped with knurled ends or finger pieces 164 and lock-nuts 165. As is clearly indicated in Fig. 6, these supports project up through apertures 166 in the table top. When resting vertically on edge on the ridge supports 161 the non-adhesive face of the label bears against a vertical post 167, the tail end of a spring-actuated pivoted arm 168 operated upon by the spring 169, the front vertical edge 170 of a block 171, and a spring-operated finger 172 pivoted thereto. It will be readily understood that the moist label is held down on the ridges 161 and against the parts 167, 168, 170, and 172 by the operation of the mutilated disk or feed-roller 93, which contacts with the back face of the label but with that portion thereof not covered with adhesive. While thus on edge and while the feed-roller 93 is out of contact therewith, due to its mutilated section, the label is shifted laterally a small amount by a bent arm 173 pulled by a spring 173ᵃ and fulcrumed on the table-top at 174 (Fig. 13), such arm being rocked by means of an adjustable screw 175 extended through the tail projection 176 of an arm 177 fixed by means of a set-screw 178 to the top end of an oscillatory rock-shaft 179 accommodated in suitable bearings 180 (Fig. 3) on the member 152 of the machine frame, the lower end of such shaft having fixed thereto an inwardly-extended arm 181 pulled inwardly by a coil contractile spring 182, and equipped with a roller 183 bearing against the face of a cam 184 on the lower longitudinal shaft 102.

By reference now to the parts of the machine for feeding and moving the pasteboard boxes, it will be obvious by reference to the drawings, more particularly to Fig. 1, that the front of the table 30 has bolted or otherwise secured thereto at 185ᵃ an inclined chute 185 open on its top and open throughout the greater portion of its front, such chute being adapted to accommodate boxes 186, cigarette boxes for instance, one on top of the other. The lower end of this box chute has an upwardly-curved extension, the upper end of the right-hand wall 187 of which, as the machine is viewed from the front, is flush with the face of the vertical plate portion or guide 191. The left-hand wall 188 of this curved extension is apertured and is supplied with a leaf-spring 189 extending through the aperture and bearing upon the boxes within the extension, such spring acting by friction to prevent downward movement of the boxes in such extension after they have once been raised by mechanism now to be described.

Beneath the table at 190 (Fig. 5) I fulcrum a bell-crank 191 (Figs. 1 and 5), the right-hand end of which has a curved projection 192, which extends through an aperture in the bottom wall of the box chute 185 and has a travel in the curved extension an amount corresponding to the length of one of the boxes reciprocated therein. This bell-crank and curved extension are actuated by means of a grooved cam 193 on the main drive shaft 48 through the instrumentality of a bifurcated bar 194 which straddles the shaft, has a roller 195 in the groove of the cam, and is pivoted to one arm of the bell-crank 191. Such reciprocation of the curved projection 192 raises the boxes one by one, by means of other boxes accommodated in the curved extension, above the table top and between the faces of the vertical plate portion 91 hereinabove referred to, and a guide 196 (Fig. 11) parallel thereto, spaced away therefrom the thickness of the box, and secured thereto by an end lateral extension 197 bolted to the bracket. The mechanism and combination of elements for feeding these boxes forwardly and applying the labels thereto so that the latter extend completely around the boxes will now be described.

On the table-top and supported by one or more angle-brackets 198 (Fig. 6), I employ a right-angle plate or guide 199, one leg or section of which is substantially in alinement with the vertical plate portion or guide 91. Opposite this guide-plate 199 I position a brush-bar 200 spaced above the table-top, supported thereon by a base 201, and supplied on its face toward the guide 199 with a brush 202 adapted to bear against the faces of the boxes as they are moved along, as described hereinafter. The forward end of the brush bar 200 terminates in or may be secured to the block 171 mentioned above. In order that the boxes may be properly held down on the table-top across which they travel, I mount on the front face of the bracket member 33 a bar 203 (Fig. 13) having at its right-hand end, as the machine is viewed from the front, another bar 204 extending forwardly and rearwardly of the machine and carrying a top guide 205 positioned over the path of travel of the boxes and adapted to prevent their rising up off of the table top.

On the bottom of the table-top I bolt a pair of bearings 206 and 207 which accommodate a reciprocatory oscillatory shaft 208 which is slid forwardly and rearwardly by a grooved cam 209 (Fig. 12) on the lower longitudinal shaft 102 referred to hereinabove, the groove of such cam coöperating with the roller of a bell-crank 210 fixed to a rock-shaft 211 oscillatory in bearings provided therefor in the frame of the machine. The upper end of this bell-crank is operatively connected to the shaft 208 by a link 212 (Fig. 9) pivoted thereto and to a sleeve 213 on the shaft 208, and free to oscillate thereon but prevented from longitudinal movement thereon, being retained in position between a fixed collar 214 and the fixed arm 215.

The oscillation or rocking of the shaft 208 is brought about by means of the co-action of the following specified elements: A pair of arms 216 spaced apart from one another are pinned or otherwise fastened to the shaft 208 and support a cylindrical rod 217 which has a sliding connection with the cam bar 218 by passing through an aperture in the upper end thereof, the lower end of such cam-rod straddling the main drive-shaft 48 and being operated by a grooved cam 219 thereon coöperating with a roller on the bar. Clearly, then, the shaft 208 by the operation of these parts is given not only a reciprocatory but also an oscillatory movement. This shaft 208 not only has fixed thereto the arm 215 referred to above, but also a similar arm 220 (Figs. 9 and 11) pinned to its forward end, these two arms supporting and carrying a pair of rods, upper and lower, 221 and 222, respectively. The arm 215 as well as the arm 220 each has a pair of laterally-extended fingers, upper and lower, 223 and 224, respectively, adapted to engage and move the boxes. In addition the pair of rods 221 and 222 has mounted thereon an intermediate block 225 supplied with a single upper finger 226. The lower rod 222 is also provided with a label stop or adjuster characterized 227, which engages the edge of the label when the rod 222 is moved by the rotation of the shaft 208. Also mounted on the table top by means of a bracket is a stop or guide-plate 228 (Fig. 13) arranged longitudinally of the machine, and beyond such guide-plate and on the short leg of the right-angle guide-plate 199, I employ a pair of brushes 229 and 230, between which the boxes are pushed or forced by means of a feed bell-crank lever 231 (Fig. 7) fulcrumed on the frame of the machine at 232 and having its top widened end 233 above the table top, such arm of the bell-crank extending upwardly through an aperture 234 in the table. As is indicated, the lower or other arm of such bell-crank is rocked or moved by a grooved cam 235 on the main drive-shaft 48. Below the brushes 229 and 230 the table has bolted thereto a narrow extension 236 on which the boxes are adapted to slide, such extension beyond the rear brush 230 having a vertical flange or wall 237 (Fig. 13) whose inner face is equipped with a yielding cushion 238 of any suitable character, such as sponge-rubber or felt.

The arm 177 hereinabove referred to has a flat enlargement or plate end 239 opposite the flange or wall 237 and similarly equipped with a cushion 240, one of the objects of the machine being to squeeze the boxes between these two cushions, whereby to bring about the proper adhesion of the labels to the boxes. To secure this most effectively, it has been found desirable to so form the cam actuating shaft 179 that for each actuation two pressures on the box will be secured between the cushions; in other words, the plate end 239 of the arm 177 approaches the boxes, causing the squeezing action, then recedes slightly and approaches again to give another squeeze, subsequently retracting out of the way until its next actuation.

Having described the construction of the various parts of the mechanism, the operation of the machine as a whole will now be set forth, under the assumption that a supply of the closed boxes 186, that is with the covers applied to the bodies of the boxes, has been placed in the chute bottom upward, and under the further assumption that a supply or stack of labels 35 has been placed bottom upward in the label chute. Under these conditions the individual labels are shifted by the rubber sections 40 of the roller 39 sufficiently to feed the labels one by one to the more rapidly revolving pair of rollers 42 and 46, which cause the labels to advance more rapidly, and consequently advance the roller 39 on its shaft 38, the latter however soon catching up with the roller to feed the next undermost label. In this manner the unpasted labels are fed one by one face downward to the label shelf 105 and are arrested in proper position by the adjustable stop 108. Before the next label is fed to the shelf the upstanding projections or end fingers 155 and 156 of the pusher or feed bar 154 remove the label laterally or forwardly from the shelf, advancing the same substantially-horizontally to the feed roller 79 and curved guides 82, which change the direction of travel of the label from horizontal to vertical, the label being positively shifted downwardly to the ridge-supports 161 by the positively-actuated rollers or disks 88 and the mutilated disk 93 contacting with unpasted portions thereof, it being understood that as the label is fed forwardly it is supplied with adhesive from the paste receptacle 116 beneath which it passes, due to the rotation of the paste-feed-roller 120, such operation of the mechanism resulting in an intentional uneven distribution of the adhesive to the label. The damp pasted label, as has been described above, is held in vertical position on its edge with its printed or display face against the post 167, pivoted arm 168, block 171, and finger 172, by the mutilated roller 93. When the time arrives, however, for the longitudinal shifting of the label by the arm or finger 173, the mutilated portion of the roller 93 will have come opposite the label so that there will be no shifting or movement of the pasted section of the label against the edge of such roller. Finger 173 then moves, as has been described, shifting the label slightly to the left as the machine is viewed from the front. Previous to the arrival of the label at the position indicated, a box, which had been elevated above the table-top between the spaced guides 91 and 196 by the movement of the curved projection 192 of bell-crank 191, had been shifted by the fingers 223 and 224 of the arm 220, working above and below the guide 196 which is spaced above the table-top for that purpose, from the position marked "A" in Fig. 6 directly above the curved extension of the box chute to the position marked "B." Such rocking of the box-feeding shaft 208 had moved the label stop or adjuster 227 to contact with the left-hand end of the label and shift the same to the right slightly to secure its correct position. In this way the exact position of the pasted label is readily secured. During the next actuation of the shaft 208 and the parts operated thereby the box at the position "B" (Fig. 6) is shifted by the finger or pusher 226, which engages its rear face, to the position marked "C." During such travel of the box its advancing face or edge strikes the pasted side of the label, and as the box advances, block 171, finger 172, post 167, and the arm 168 act to turn the oppositely-extended portions of the label about the edges of the box, and to cause such parts to adhere to the two flat sides of the box, the arm 168 applying a yielding pressure on the label throughout the entire width of the box, the plate 199 and brush 202 also applying pressure. During such travel of the arm 226 it passes over the block 171, pressing down out of the way the spring-actuated finger 172, which immediately again swings up to vertical position. Also substantially simultaneously with the operation of shaft 208 the box pusher 233 shifts the row of boxes between the brushes 229 and 230 to the right as the parts are viewed in Figs. 6 and 13, an amount corresponding substantially to the thickness of a box, and during such travel of the left-hand box of such row in the position "D"

the protruding flap 241 of the label is turned over against the edge or face 242 of the box by the right-angle stationary plate 199. During this shifting of the row of boxes the fingers 223 and 224 of the arm 215 straddle the brush-bar 200 and brush 202, one being above and the other below such brush parts, and advance the partially labeled box from the position "C" to the position "D," the pusher 233 retracting soon enough to permit the passage of the box between itself and the row of boxes, and during such passage the remainder of the pasted label flap 241 of the left-hand box in the row is folded over onto the bottom of such box by the advance of the box which is being shifted from position "C" to position "D." It should be clear, therefore, that the box entering the row completes the labeling of the next adjacent box and is itself in turn completed by the next advancing box. The travel of the series of boxes between the companion and oppositely-acting brushes 229 and 230 is sufficiently slow so that a proper adhesion of the label to the box and a partial drying of the paste is secured, these brushes applying sufficient friction to the boxes to prevent their displacement and hold them properly in position for the folding over of the label of the last box by the entering box. As the boxes leave the brushes they pass between the squeezing cushions 238 and 240, the latter having a sort of double actuation at each operation to assist in causing an effective contact between the label and the box. After the boxes pass from between these cushions, they may be discharged into any suitable receptacle, such as a basket, by the advancing or discharging row of boxes.

From an understanding of the operation of this machine it should be clear that the box-feeding portion of the mechanism continuously advances the boxes step by step in spaced relation across the top of the table, and that the pasted labels are fed individually between such boxes, being applied to the next succeeding box in the manner indicated. It will be apparent, therefore, that on the top of the table there are a number of boxes at all times in various degrees or conditions of completion.

After having described the construction, operation, and interaction of the various parts and elements of this structure, I wish to note that the invention is not limited and restricted to this precise and exact embodiment or to the particular features of construction of this especial machine, because many minor mechanical changes may be made in the parts of the mechanism without departure from the substance of the invention and without the sacrifice of any substantial or material advantages.

Whereas a device of this character is particularly well adapted for the application of labels to cigarette boxes, the invention is in no way restricted to machines constructed for this particular purpose, since the invention is of comparatively broad scope and relates to the application of labels to other devices than boxes, whether of paste board, tin or other material.

I claim:

1. In a labeling machine, the combination of an inclined chute for receiving boxes, an upwardly extending guide leading from the lower end of said chute, means for moving the boxes successively along said guide, said guide being bent so that it will discharge the boxes with their label-receiving sides in vertical positions, and means to apply a label to a vertical side of each box, substantially as described.

2. In a labeling machine, the combination of an inclined chute for receiving boxes, a guide for receiving the boxes from the chute, reciprocating means for moving the boxes successively along said guide, said guide being bent to cause it to discharge said boxes with their label-receiving sides in vertical positions, and means to apply a label to a vertical side of each box, substantially as described.

3. In a labeling machine, the combination of an inclined chute for receiving boxes, an upwardly extending guide for directing the boxes in their passage from said chute, reciprocating means for moving the boxes successively along said guide, said guide being bent so as to discharge said boxes with their label-receiving sides in vertical positions, means to prevent the descent of the boxes into said guide during the retraction of said reciprocating means, and means to apply a label to a vertical side of each box, substantially as described.

4. In a machine of the character described, the combination of an inclined chute adapted to hold boxes resting one on top of the other, an upward curved extension chute at the lower end of and in communication with said inclined chute, a fulcrumed arm having a curved portion acting to shift the boxes in said inclined chute when they reach their lowermost position to said extension chute and to force the boxes in the latter upwardly, means to rock said arm, and means to apply labels to the vertical sides of said boxes, substantially as described.

5. In a machine of the character described, the combination of means to apply paste to a face of a label leaving one or more sections of such face free from the paste, and one or more feed rollers adapted to move the label, such rollers contacting only with the unpasted sections of the pasted face of the label, substantially as described.

6. In a machine of the character described, the combination of means to apply paste to the face of a label leaving one or more sections of such face free from the paste, one or more feed rollers to move the label, and one or more guides for such labels, said feed rollers and guides being adapted to contact only with the unpasted sections of the pasted face of the label, substantially as described.

7. In a machine of the character described, the combination of means to support an adhesive label, means to move a box against the adhesive coated side of the label and to continue the movement of the box and label in the same direction, and a pressure means adapted to wipe across the advancing face of the box and label to cause adhesion of the latter to the former, substantially as described.

8. In a machine of the character described, the combination of means to support an adhesive label, means to move a box against the adhesive coated side of the label, and to continue the movement of the box and label, and a yielding arm actuated by the movement of the box to wipe across the advancing face of the box and label to cause adhesion of the latter to the former, substantially as described.

9. In a machine of the character described, the combination of means to support an adhesive label, means to move a box against the adhesive coated side of the label and to continue the movement of the box and label, and a yielding arm actuated by the movement of the box to wipe across the advancing face and another adjacent face of the box and label to cause adhesion of the latter to the former, substantially as described.

10. In a machine of the character described, the combination of a pair of opposed cushioning devices one stationary and the other movable, means to advance a series of freshly covered boxes progressively therebetween, and means to repeatedly actuate the movable cushioning device to squeeze each of the boxes a plurality of times at different stages of its advance therebetween, substantially as described.

11. In a machine of the character described, the combination of a cushion, an arm, means to advance a series of labeled boxes between said cushion and arm, and means to move said arm to squeeze the boxes between itself and said cushion, said operating means giving the boxes a plurality of squeezes at each actuation, substantially as described.

12. In a machine of the character described, the combination of a table, a movable finger, means to feed labels, and means to feed boxes against the labels and adjacent to said finger whereby the latter may act to assist in applying the labels to said boxes, said finger being in the path of travel of said box feeding means and adapted to be moved by the latter out of the way, substantially as described.

13. In a machine of the character described, the combination of a table, a spring-actuated fulcrumed finger, means to feed labels, and means to feed boxes against the labels and adjacent to said finger whereby the latter may act to assist in applying the labels to said boxes, said finger being in the path of travel of said box feeding means and adapted to be swung to normal position by its spring action, substantially as described.

14. In a machine of the character described, the combination of means to apply an adhesive to portions of labels, means to feed said labels including a mutilated roller adapted to contact with the portion of the labels not supplied with adhesive, and means to shift the labels when the roller is out of contact therewith, due to its mutilated portion, substantially as described.

15. In a machine of the character described, the combination of means to apply an adhesive label to the first face of a box, means to fold the label over on to the second and third faces of the box which are adjacent to said first face, means to apply the portion of the label protruding from said second face to the fourth face of the box, and means to fold the remaining portion of the label on to the third face of the box, substantially as described.

16. In a labeling machine, the combination of a receiving chute for boxes, guide means leading upwardly from the lower end of said chute, a pivotally mounted arm for successively moving said boxes from said chute through said guiding means, actuating means associated with said arm for moving said boxes in a horizontal plane after their delivery from said guiding means, and means arranged in advance of the guiding means to apply labels to said boxes, substantially as described.

17. In a labeling machine, the combination of a box-receiving chute, guiding means leading from the lower end of said chute, an oscillatory shaft, an arm mounted on said shaft for successively moving said boxes from said chute through said guiding means, actuating members mounted on said shaft, means for moving said shaft in the direction of its longitudinal axis, whereby the actuating members on said shaft will move said boxes in a horizontal plane after their delivery from said guiding means, and means to interpose adhesive labels in the horizontal path of the boxes, substantially as described.

18. In a labeling machine, the combination of a box-receiving chute, guiding means leading from the lower end of said chute, means for successively moving said boxes upwardly through said guiding means, means for moving said boxes in a horizontal plane after their delivery from said guiding means, and means for bringing a succession of labels into a predetermined position, whereby said labels will be applied to said boxes on movement of the latter, substantially as described.

19. In a labeling machine, the combination of a receiving chute, guiding means leading from the bottom of said chute, means for successively carrying boxes from said receiving chute through said guiding means, means for moving said boxes in a horizontal plane after they have been delivered from said guiding means, means for bringing the labels successively into the path of said boxes, and means associated with said box-moving means for adjusting said labels in their proper positions, substantially as described.

20. In a machine of the character described, the combination of means to apply a label to one side of a box and to leave an end of a label projecting beyond the edge of the box, and means to impart to the said partially labeled box and to another box relative movement, whereby to wipe the projecting end of the label over into contact with another face of the first named box, substantially as described.

21. In a machine of the character described, the combination of means to apply a label to one side of a box and to leave an end of the label projecting beyond the edge of the box, and means to effect relative sliding movement of the said box with reference to another box whereby to wipe the projecting end of the label over upon another side of the first named box, substantially as described.

22. In a machine of the character described, the combination of means to apply a label to one side of a box and to leave an end of the label projecting beyond the edge of the box, and means to move a second box against the projecting end of the label whereby to wipe the end of the label over upon another face of the first named box, substantially as described.

23. In a machine of the character described, the combination of means to move a box with one side against one end of an adhesive label, and means to move a second box against the other end of the label to press the label over upon another side of the first box, substantially as described.

24. In a machine of the character described, the combination of means to move a box with one side in contact with one end of an adhesive label to secure its adherence thereto, means to move the box and partially attached label laterally to make way for a second box, and means to move the second box in parallelism to the unlabeled face of the first box and against the unattached label portion to wipe the latter over upon the unlabeled face of the first box, substantially as described.

25. In a machine of the character described, the combination of means to move a box with one side in contact with one end of an adhesive label to secure its adherence thereto, means to move the box and partially attached label laterally to make way for a second box, means to move the second box in parallelism to the unlabeled face of the first box and against the unattached label portion to wipe the latter over upon the unlabeled face of the first box, said means coöperating to press the boxes together to secure intimate adhering contact of label and box, substantially as described.

26. In a machine of the character described, the combination of means to apply one end of a label to a box, a chute, means to move the box to a position across the open end of the chute, means to force the box into the chute whereby to wipe the free portion of the label into contact with another face of the box leaving the end of the label extending beyond said other face into the path of the next box, whereby it is wiped by such succeeding box into contact with yet another face of the first box, substantially as described.

27. In a machine of the character described, the combination of means to apply one end of a label to a box, a chute, means to move the box to a position across the open end of the chute, means to force the box into the chute whereby to wipe the free portion of the label into contact with another face of the box leaving the end of the label extending beyond said other face into the path of the next box, whereby it is wiped by such succeeding box into contact with yet another face of the first box, and means to frictionally retard the progress of the boxes through the chute whereby the required pressure to cause the adherence of the labels to the boxes is secured by the action of the boxes one against another, substantially as described.

MICHAEL J. MILMOE.

Witnesses:
ALBERT BLAUVELT,
FRED G. BROOKS.